July 2, 1963

D. R. SMITH 3,095,884

CIGAR TIPPING MACHINE

Filed July 17, 1961

INVENTOR.
Dale R. Smith,
BY
Paul & Paul
ATTORNEYS.

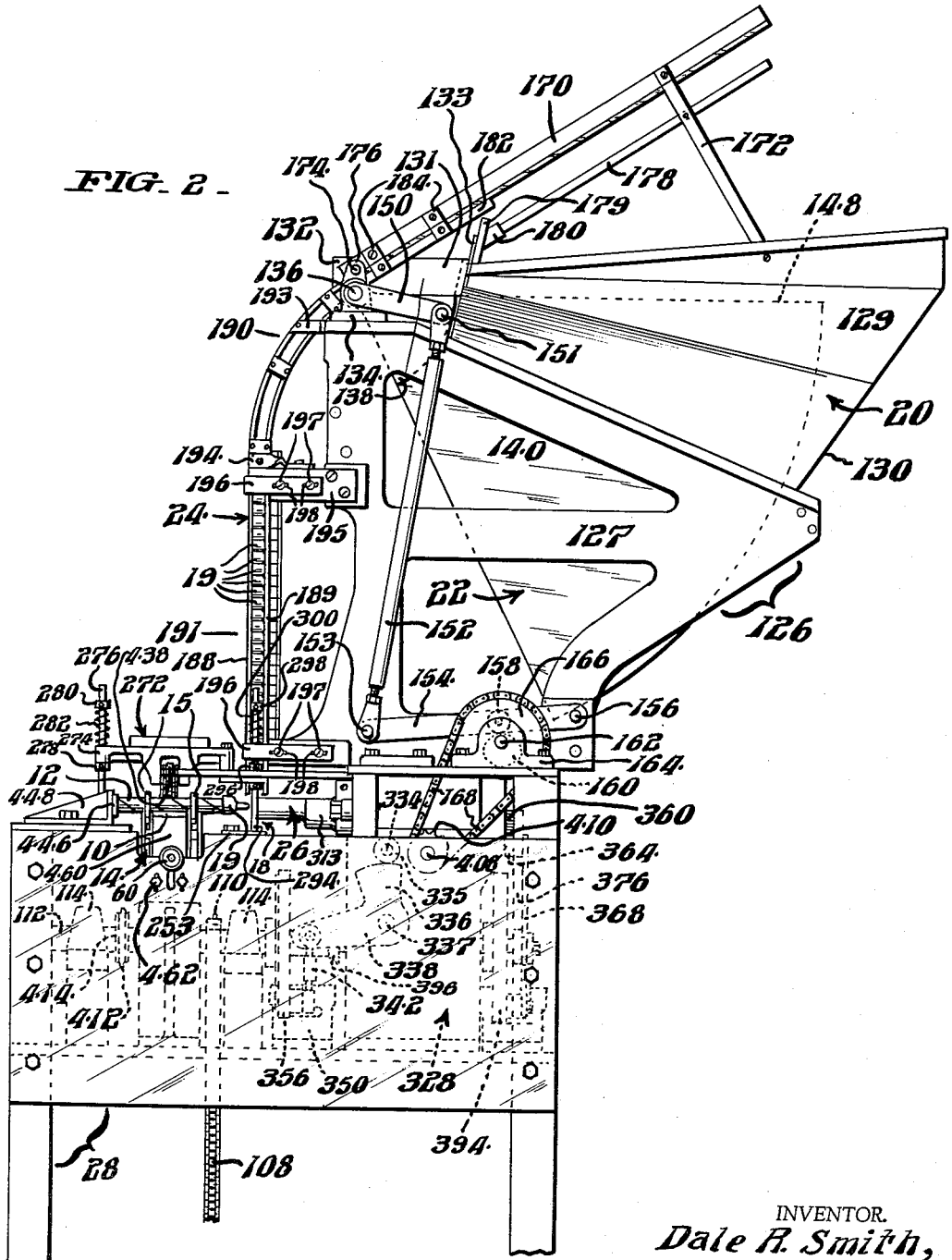

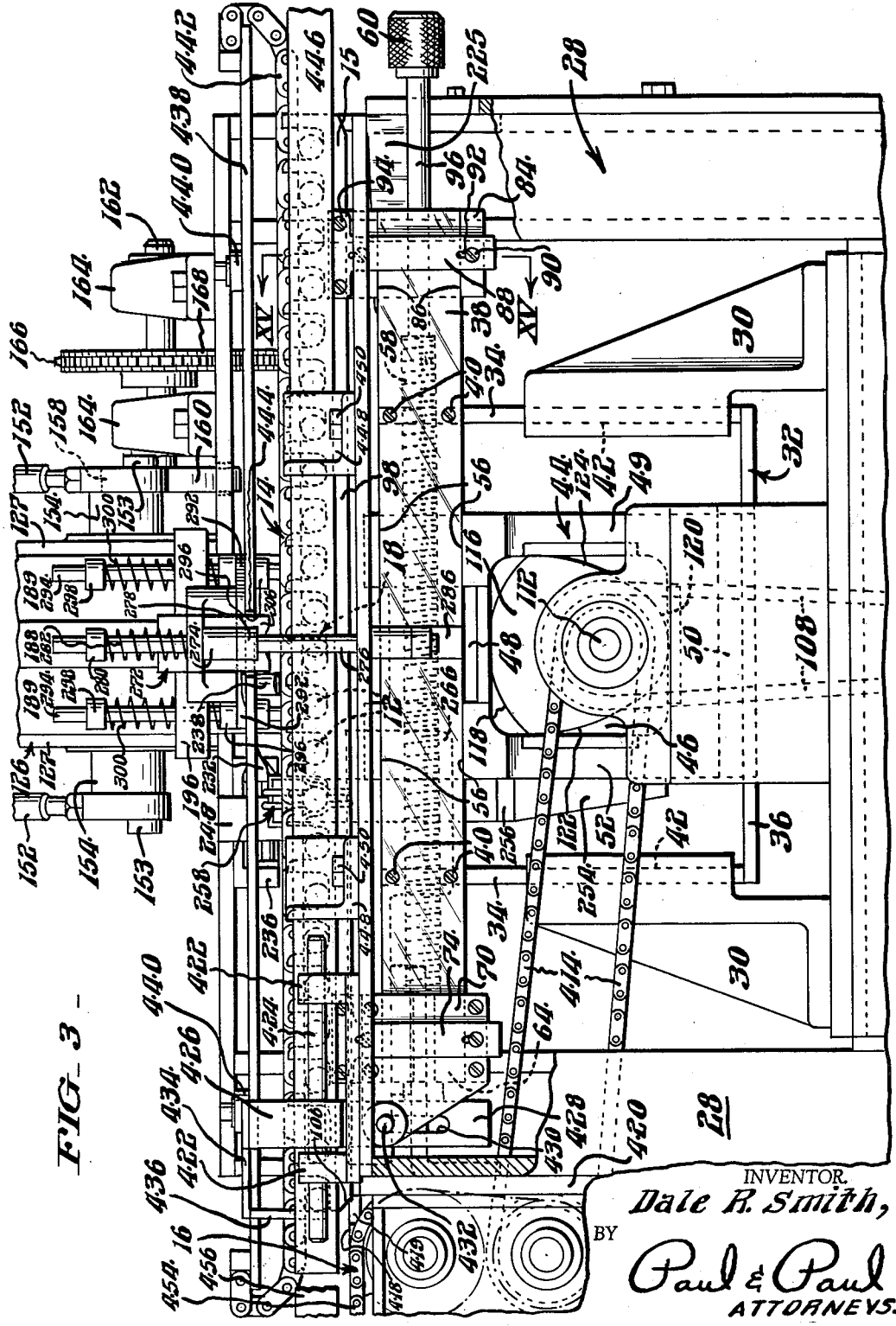

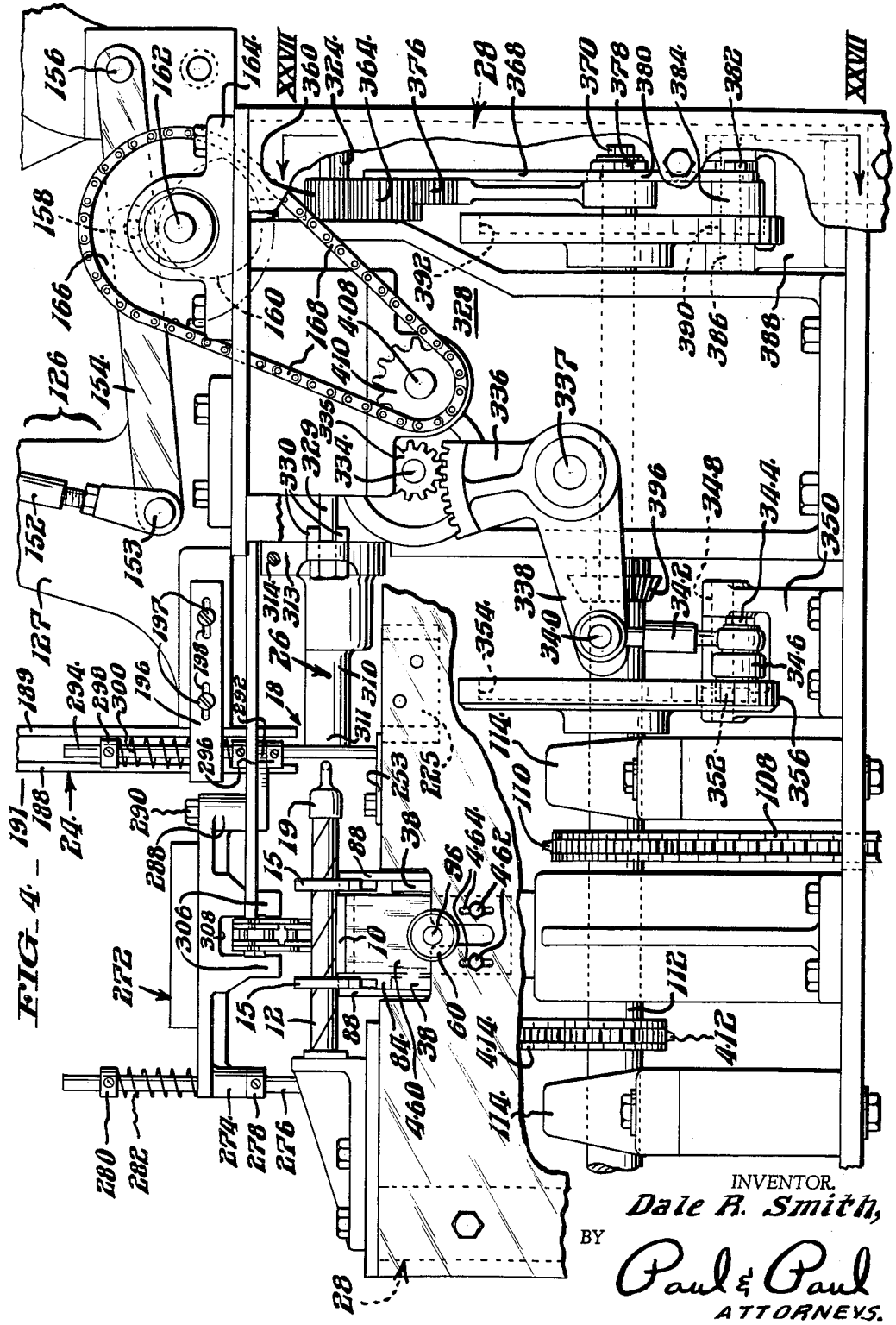

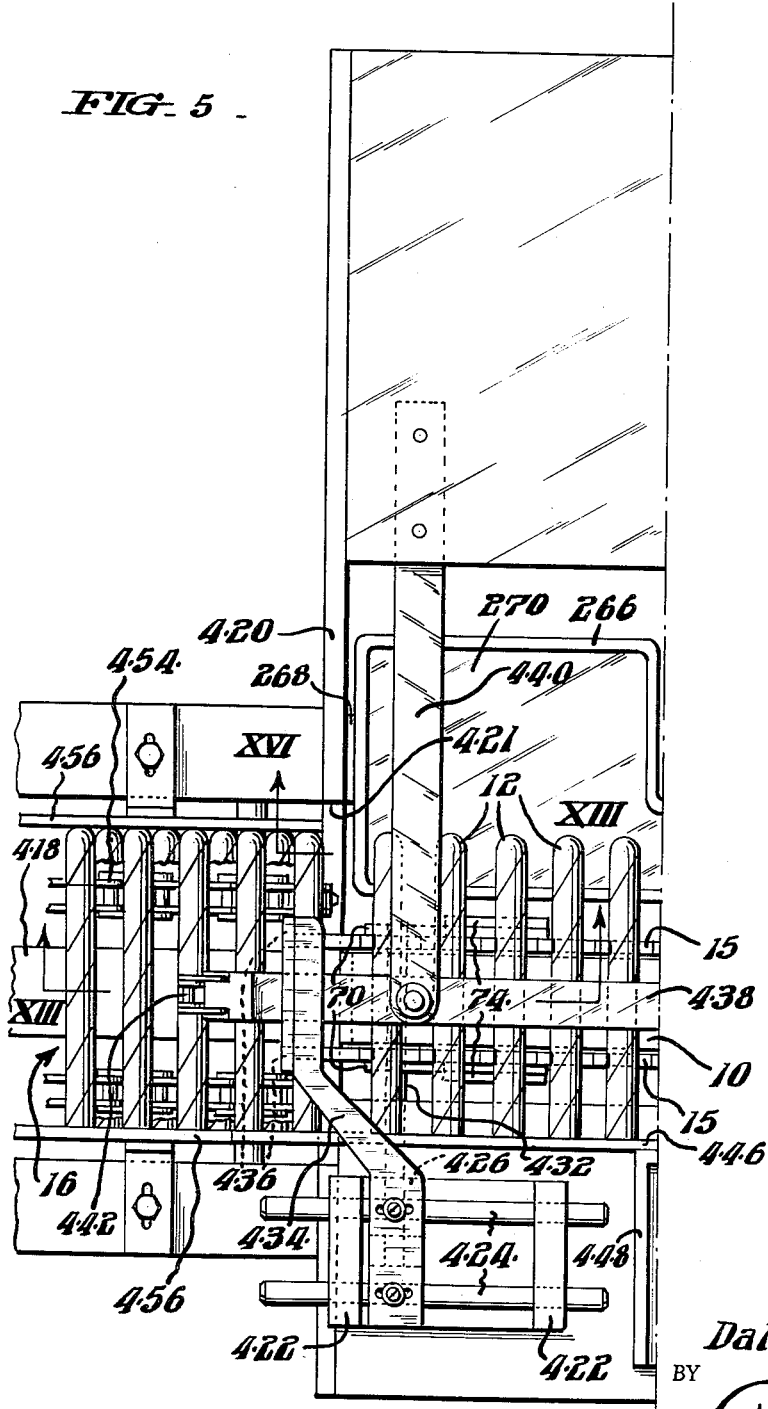

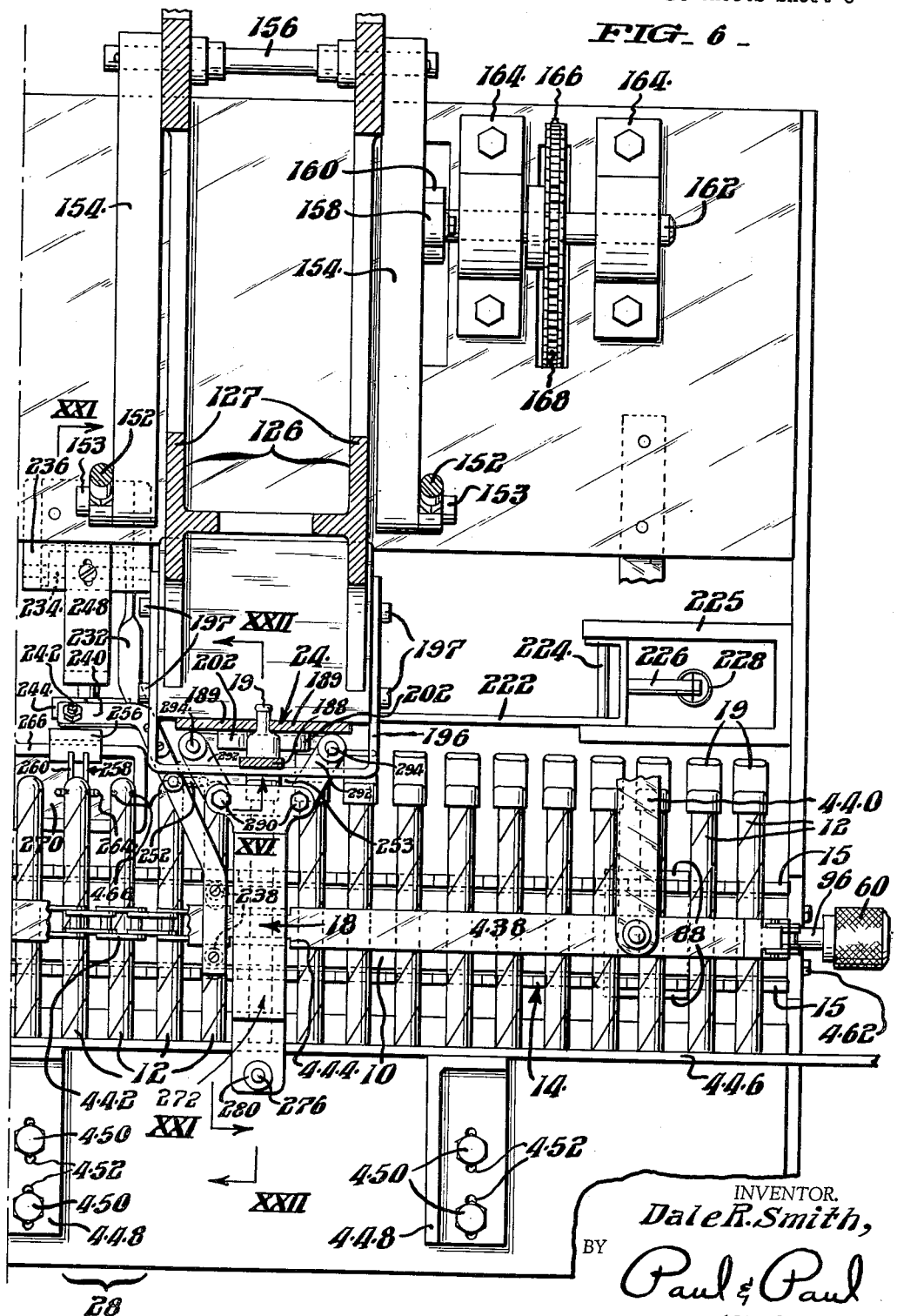

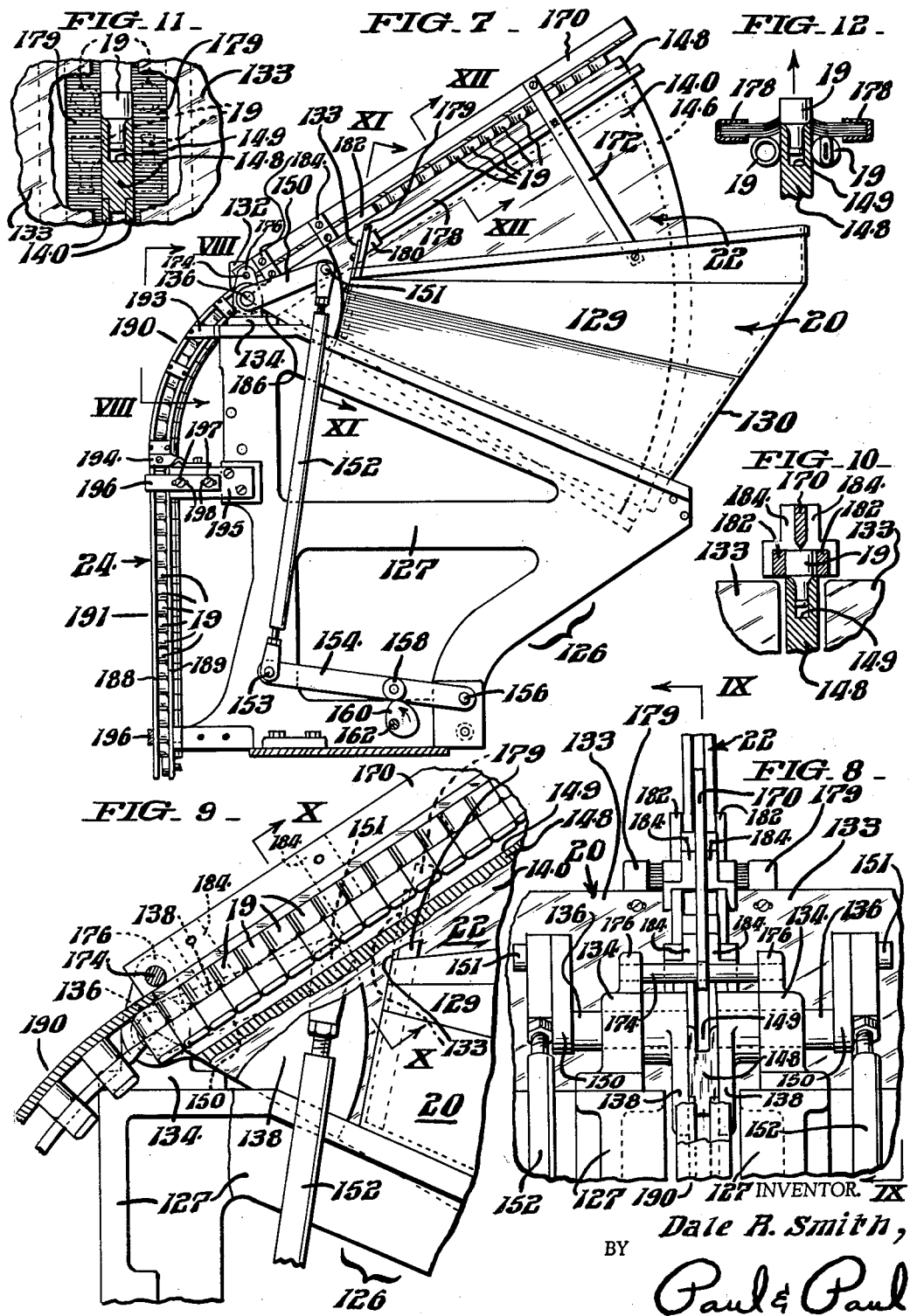

July 2, 1963 D. R. SMITH 3,095,884
CIGAR TIPPING MACHINE
Filed July 17, 1961 14 Sheets-Sheet 8
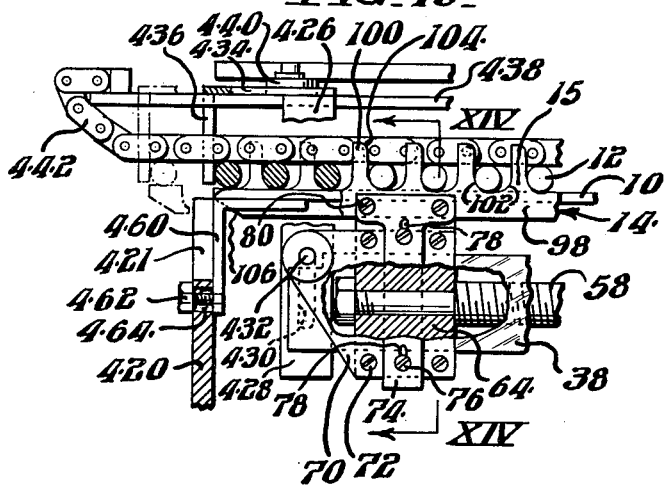
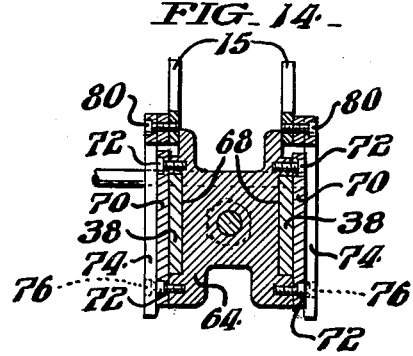
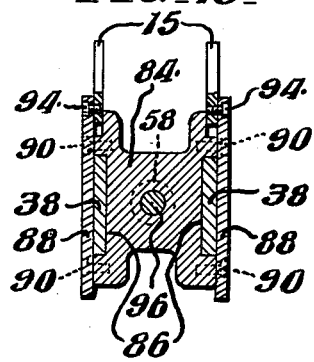
INVENTOR.
Dale R. Smith,
BY
Paul & Paul
ATTORNEYS.

July 2, 1963
D. R. SMITH
3,095,884
CIGAR TIPPING MACHINE
Filed July 17, 1961
14 Sheets-Sheet 9
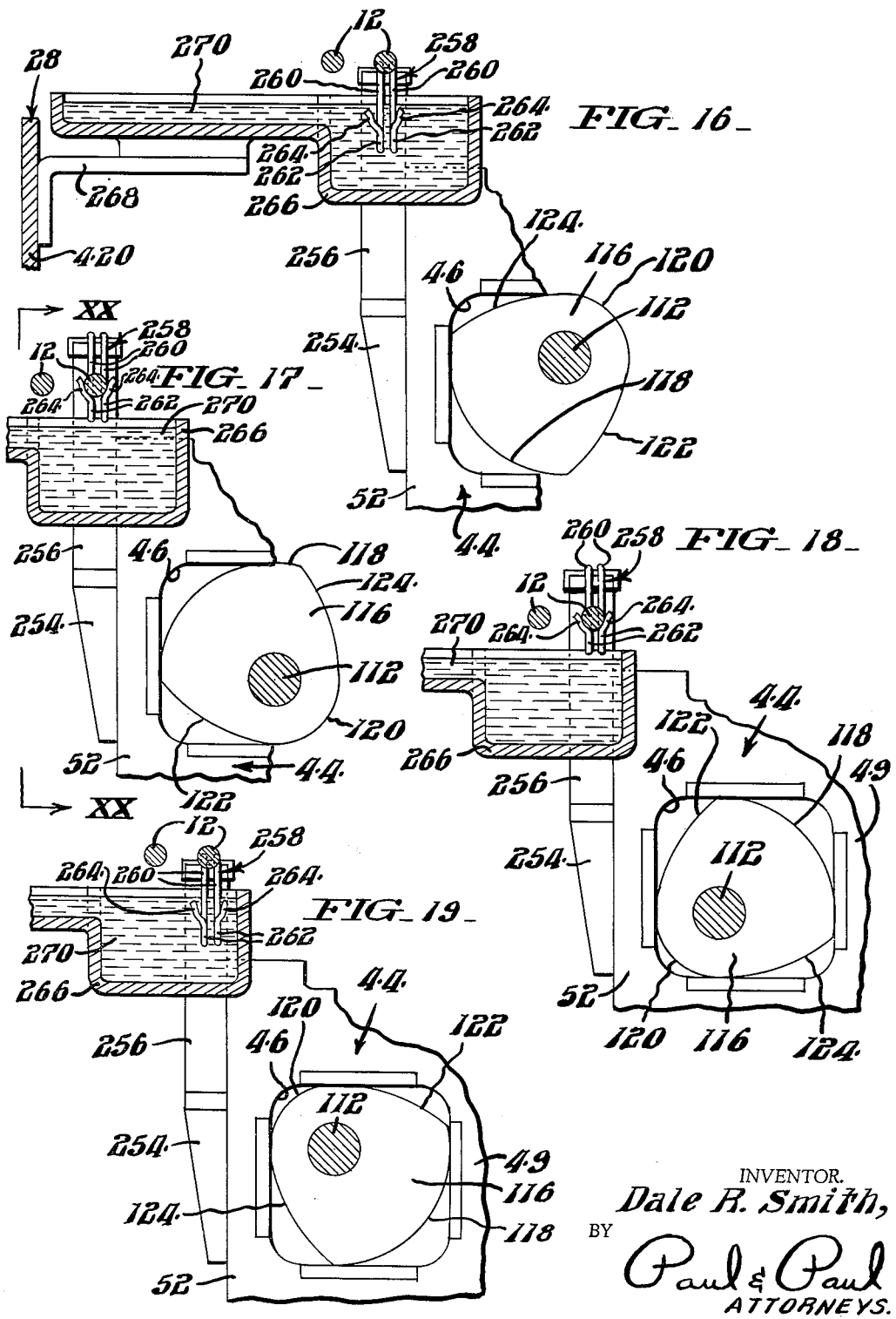
INVENTOR.
Dale R. Smith,
BY
Paul & Paul
ATTORNEYS.

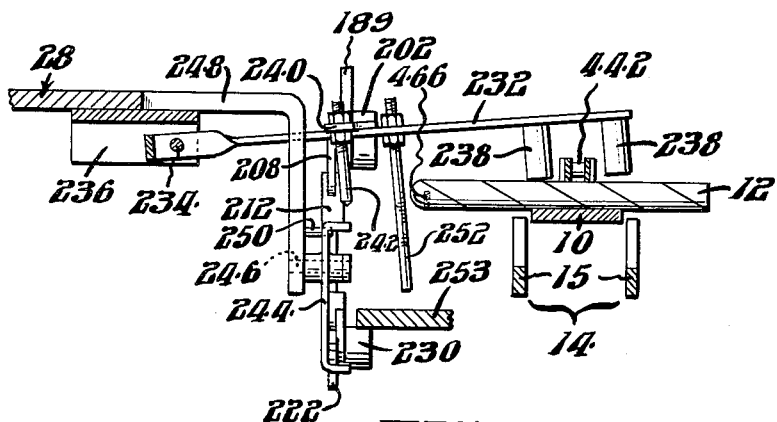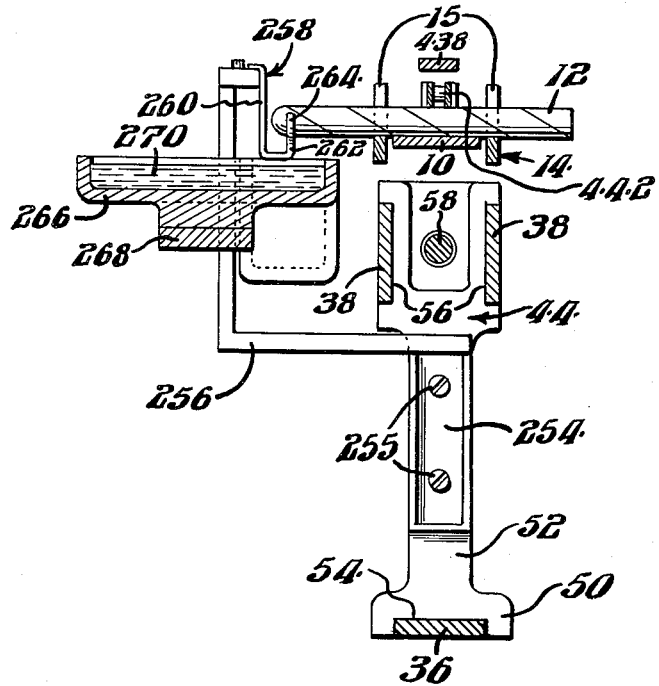

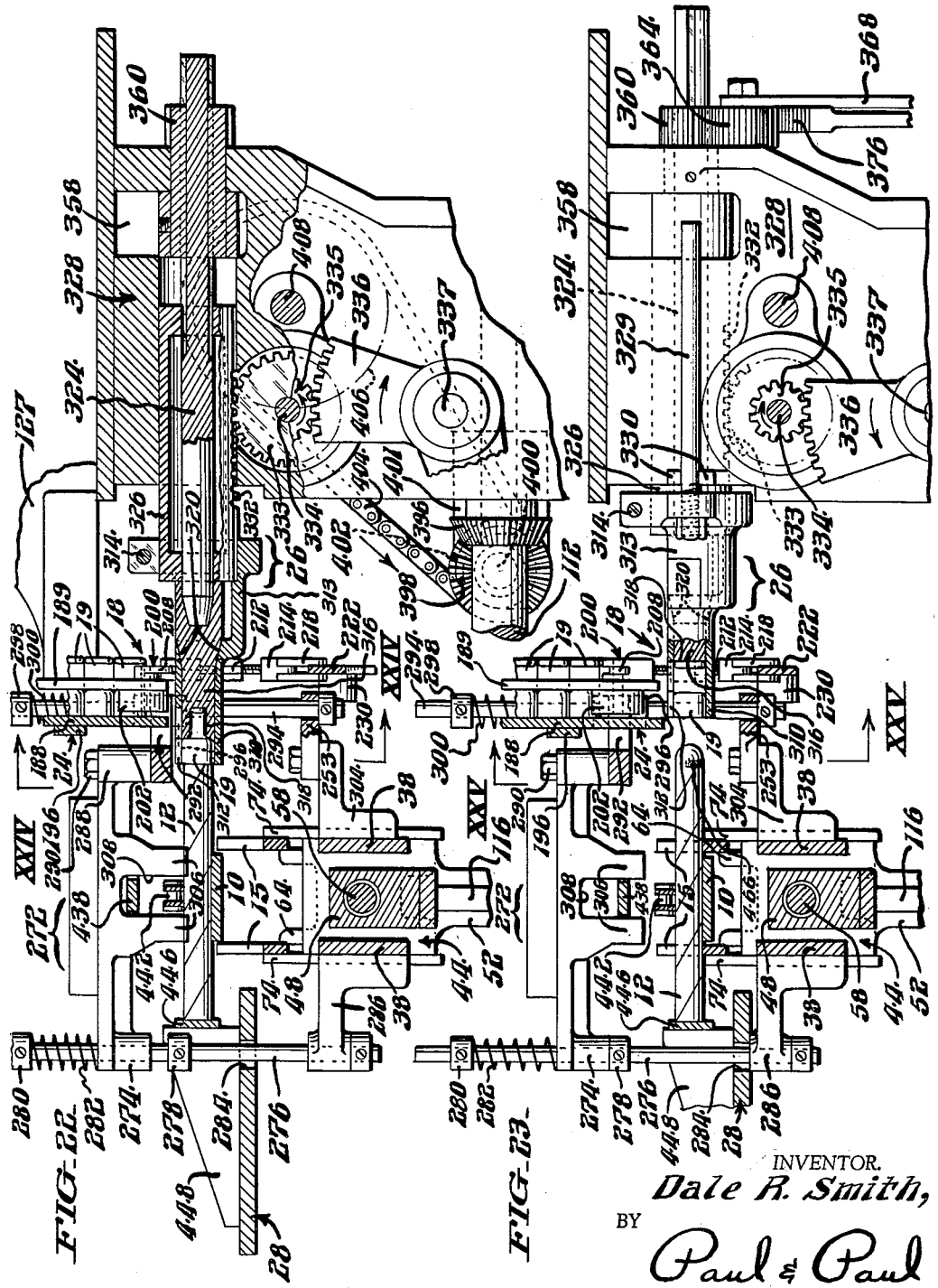

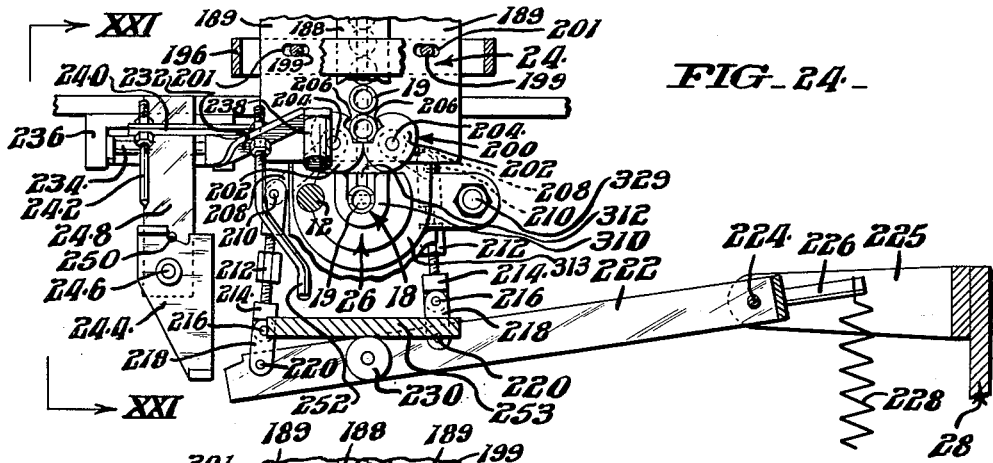
FIG_24_
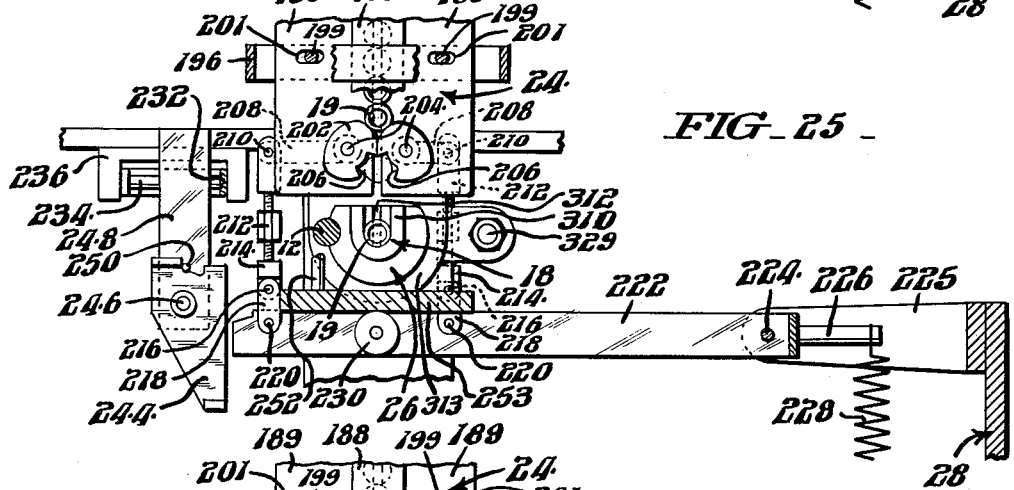
FIG_25_
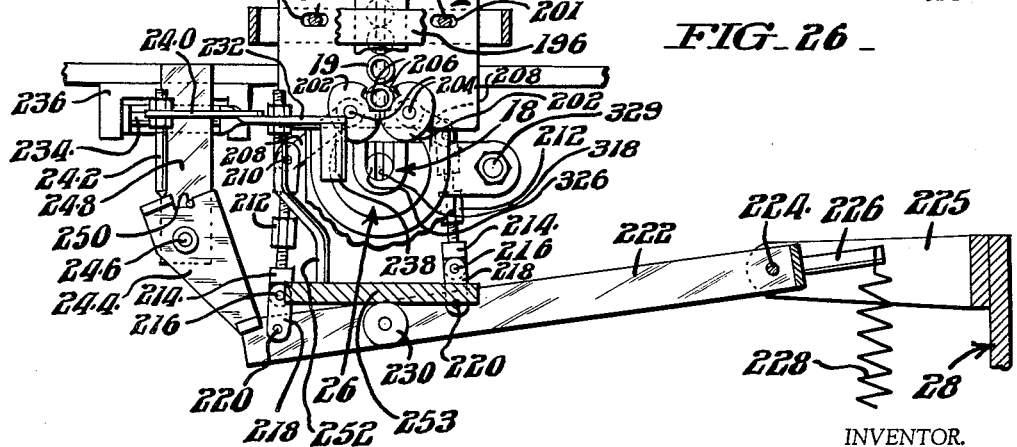
FIG_26_
INVENTOR.
Dale R. Smith,
BY
Paul & Paul
ATTORNEYS.

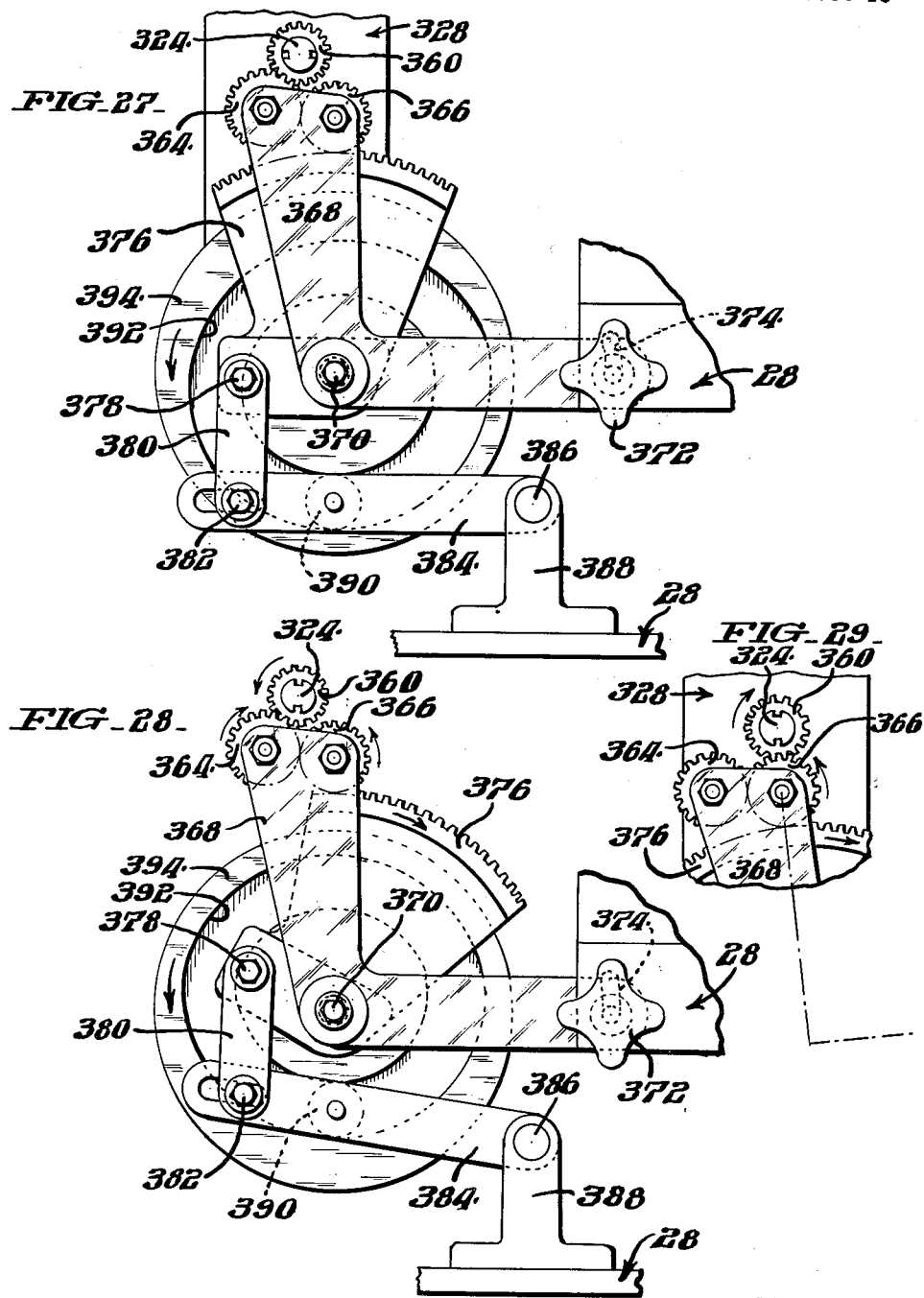

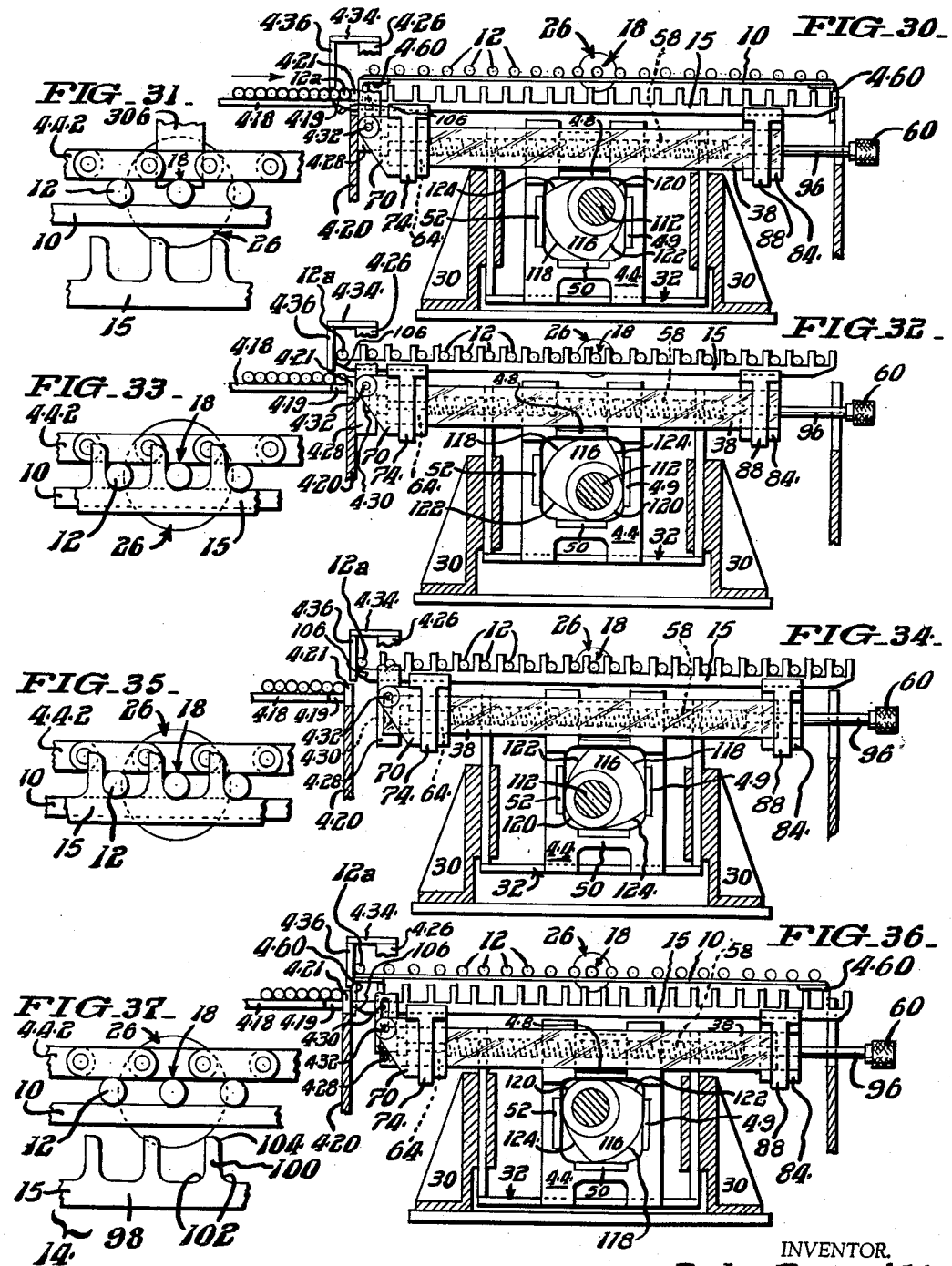

United States Patent Office 3,095,884
Patented July 2, 1963

3,095,884
CIGAR TIPPING MACHINE
Dale R. Smith, Red Lion, Pa., assignor to York Production Engineering Co., Inc., Windsor, Pa., a corporation of Pennsylvania
Filed July 17, 1961, Ser. No. 124,698
5 Claims. (Cl. 131—88)

This invention relates generally to apparatus for tipping cigars and the like, and particularly to an improved machine for placing holders on the ends of cigars or the like.

An object of the invention is to provide an improved machine which will automatically apply holders to cigars in a reliable and positive manner without damage to the cigars or holders.

Another object is to provide such a machine with a capacity that matches that of a high speed cigar wrapping machine.

Another object is to provide such a machine which advances the cigars over a horizontally extending platform and applies the holders to them without the cigars leaving the platform and without the pattern of their movement over the platform being interrupted.

Another object is to provide such a machine with means moving in repeating cycles in a square pattern to advance the cigars over the platform.

Another object is to provide such a machine in which the means aforesaid keeps the cigars separated from each other and advances them over the platform without rolling them.

Another object is to provide such a machine with means for rotating the holders selectively in either direction as they are applied to the cigars thereby to tighten the roll of the cigars.

Another object is to provide such a machine with means for sensing the absence of a cigar at the tipping station and for automatically interrupting the feeding of holders to the tipping station.

Another object is to provide such a machine accommodating cigars of a certain size and readily changed over for accommodating cigars of a different size.

Other objects of the invention will become apparent when the following description is read with reference to the accompanying drawings in which:

FIG. 2 is a side view of the machine;

FIG. 3 is an enlarged fragmentary front view of the machine;

FIG. 4 is an enlarged fragmentary side view of the machine, some parts being broken away to expose others;

Figure 1:
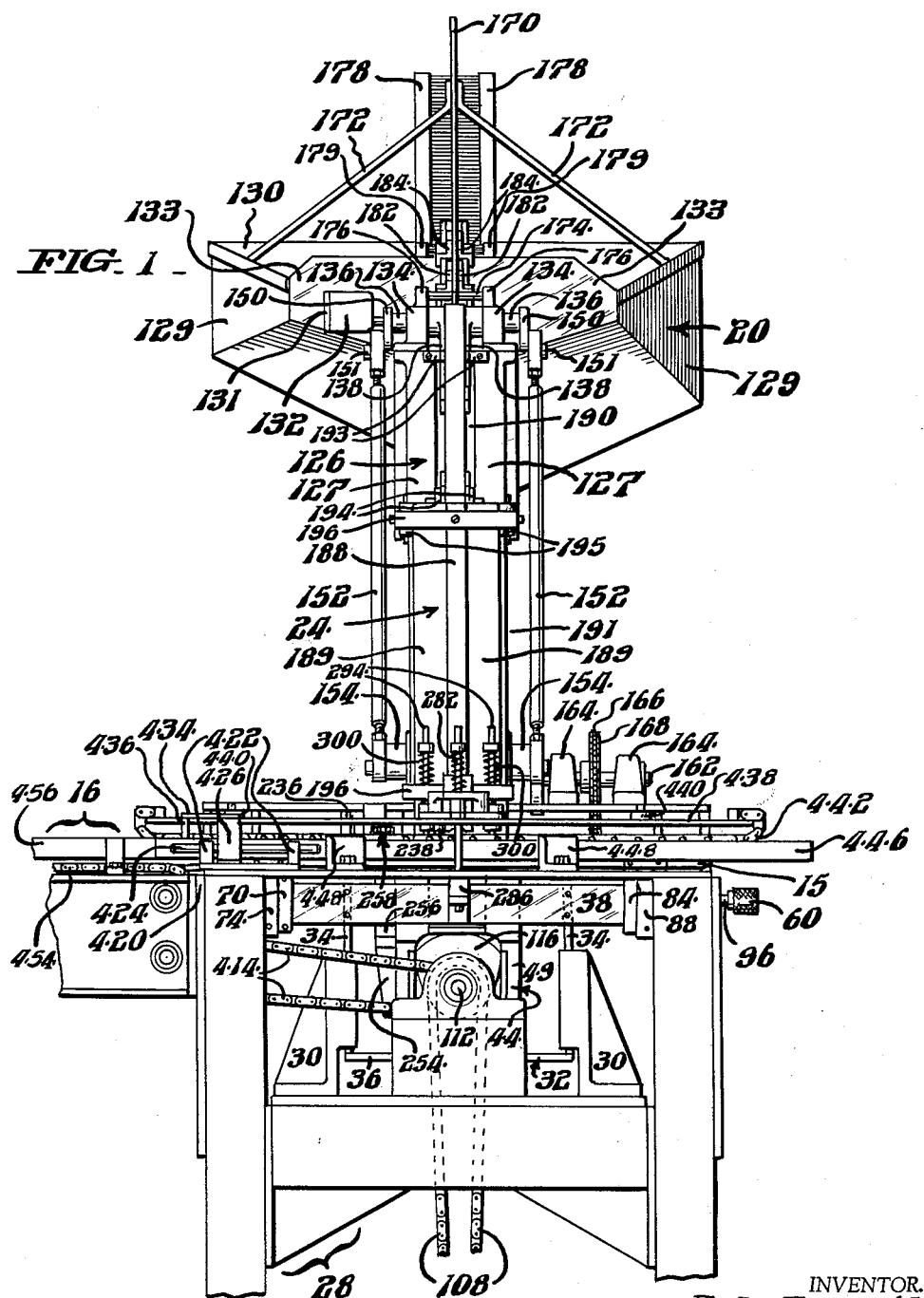
FIG. 1 is a front view of a cigar tipping machine constructed in accordance with the invention.

FIGS. 5 and 6 together are an enlarged horizontal section through the machine;

FIG. 7 essentially is a fragmentary side view of the machine;

FIG. 8 is an enlarged fragmentary front view of the machine, as indicated at VIII—VIII in FIG. 7;

FIG. 9 is a section, as indicated at IX—IX in FIG. 8;

FIG. 10 is a section, as indicated at X—X in FIG. 9;

FIG. 11 is an enlarged section, as indicated at XI—XI in FIG. 7, parts being broken away to expose others;

FIG. 12 is an enlarged section, as indicated at XII—XII in FIG. 7;

FIG. 13 is a section, as indicated at XIII—XIII in FIG. 5, parts being broken away to expose others;

FIG. 14 is a section, as indicated at XIV—XIV in FIG. 13;

FIG. 15 is a section, as indicated at XV—XV in FIG. 3;

FIGS. 16–19 are sections, as indicated at XVI—XVI in FIGS. 5 and 6, showing different positions of the glue applicator;

FIG. 20 is a section, as indicated at XX—XX in FIG. 17;

FIG. 21 is a section, as indicated at XXI—XXI in FIG. 6;

FIGS. 22 and 23 are sections, as indicated at XXII—XXII in FIG. 6, showing different conditions;

FIG. 24 is a section, as indicated at XXIV—XXIV in FIG. 22;

FIG. 25 is a section, as indicated at XXV—XXV in FIG. 23;

FIG. 26 is similar to FIG. 24, but shows a different condition;

FIGS. 27–29 are views indicated at XXVII—XXVII in FIG. 4, showing different conditions;

FIGS. 30, 32, 34, and 36 are views illustrating different phases in a cycle of the machine; and FIGS. 31, 33, 35, and 37 are enlarged fragmentary views corresponding respectively to FIGS. 30, 32, 34, and 36, showing the relationship of parts at the tipping station.

Referring particularly to FIGS. 1 to 6, an exemplary machine constructed in accordance with the invention comprises a horizontally extending platform 10 over which cigars 12 are advanced from left to right (as viewed in FIG. 1) by rack means 14 including a pair of laterally spaced, horizontally extending racks 15 disposed respectively on opposite sides of the platform 10. Cigars 12 are delivered to the machine by a conveyor, generally designated 16, and are moved by the racks 15 over the platform 10 past a tipping station 18 to a wrapping machine (not shown). Holders 19 from a hopper 20 are delivered by suitable means, generally designated 22, to a magazine 24, from whence they are gravity fed to holder transferring and applying means, generally designated 26, which applies the holders 19 to the cigars as they arrive at the tipping station 18.

Referring particularly to FIGS. 3, 4, and 20, affixed to the main frame of the machine, generally designated 28, are a pair of laterally spaced brackets 30. Between the brackets 30 is a rigid frame, generally designated 32, which comprises a pair of laterally spaced upright members 34, a horizontally extending member 36 connecting the lower end portions of the members 34, and a pair of horizontally extending laterally spaced members 38 affixed to the upper end portions of the members 34, as by screws 40. The brackets 30 have formed therein vertically extending ways 42 which slidably receive the frame members 34, respectively.

Referring particularly to FIGS. 3, 20, and 23, within the frame 32 is a rigid cam follower frame, generally designated 44. The frame is provided with a large square opening 46. At the top of the frame 44, over the opening 46, is a horizontally extending member 48. On the right hand side of the opening 46 is an upright member 49. At the bottom of the frame 44, under the opening 46, is a horizontally extending member 50. On the left hand side of the opening 46 is an upright member 52. The undersurface of member 50 is channelled as at 54 for slidably fitting over member 36 of the frame 32, and the opposite sides of top member 48 are channelled as at 56 for slidably fitting over members 38 of the frame 32.

Referring particularly to FIGS. 3, 13, and 14, a horizontally extending screw 58 is threaded through member 48. The screw is provided at one end with a finger knob 60. The opposite end of the screw has a reduced diameter portion turnably received by a block 64 having opposite sides channelled as at 68 for slidably fitting over members 38 of the frame 32. On each side of the block 64 is a plate 70 secured to the block by screws 72, and overlying each plate 70 is a plate 74 secured by screws 76 extending through elongated openings 78. Screws 80 extending through plates 74 secure the racks 15 in position. At the right hand end of the machine is a block 84 having opposite sides channelled as at 86 for slidably fitting over members 38 of frame 32. On each side of the block is a plate 88 secured to the block by screws 90 projecting through elongated openings 92. Screws 94 extending through plates 88 secure the racks 15 in position. The block 84 is provided with an opening through which freely extends an unthreaded section of the screw 96.

Referring particularly to FIG. 13, the main body of rack 15, designated 98, bears a series of equally spaced upright fingers 100. At the root of each finger, on each side thereof, the rack is rounded as at 102. At the tip of the finger one side thereof is rounded as at 104. The terminal portion of the rack 15, at the left hand end of the machine, is beveled as at 106, and the finger nearest to this beveled terminal rack portion is set back therefrom a substantial distance.

Referring particularly to FIGS. 1 to 4, a drive chain 108 is trained over a sprocket 110 affixed to a cam shaft 112. The shaft 112 turns in a pair of bearings 114. A cam 116 is affixed to shaft 112 and turns with it. This cam is provided with a raised arcuate cam surface 118, a low arcuate cam surface 120 diametrically opposite cam surface 118, and diametrically opposite curvilinear cam surfaces 122 and 124 joining the cam surface 118 and 120.

Referring particularly to FIGS. 1, 2, 6, and 7, seated upon the main frame 28 of the machine is an auxiliary frame, generally designated 126, comprising laterally spaced sections 127. Mounted upon the frame 126 is a hopper, generally designated 20, provided with opposite side walls 129, a rear wall 130 and a front wall 133. Mounted upon the hopper is a bracket 131 carrying a vibrator 132.

Referring particularly to FIGURES 7, 8, and 9, seated respectively upon the frame sections 127 of the frame 126 are a pair of bearings 134, each of which receives a stub shaft 136, the inner end of which has affixed thereto a flange 138. These flanges are coaxially related and are affixed respectively to opposite side plates 140 of a flat sector-shaped member, generally designated 22. Between the plates 140 are spacer means including a bar 146 between the arcuate peripheral portions of the plates and a delivery bar 148 between radially extending peripheral portions of the plates. The bar 148 is provided with an exposed channel 149 for receiving holders 19.

Referring particularly to FIGURES 1 to 4, 6, and 7 to 9, rigidly secured to each stub shaft 136 is an arm 150 bearing a pin 151 to which is connected the upper end of an adjustable link 152. The lower end of the link 152 bears a pin 153 to which is connected one end of an arm 154. The opposite end of arm 154 is rigidly secured to a shaft 156 journaled in the frame 126. One arm 154 carries a cam roller 158 overlying a cam 160 affixed to a shaft 162, which shaft turns in a pair of bearings 164. The shaft 162 carries a sprocket 166 about which is trained a chain 168.

Referring particularly to FIGS. 1, 2, and 7 to 12, in an inclined position, above the hopper 20 is a bar 170 the upper end of which is supported from the hopper 20 by a pair of brackets 172 respectively on opposite sides of the bar 170. The lower end of the bar is carried by a pin 174, the opposite ends of which are secured to lugs 176 respectively carried by bearings 134. On each side of the sector 140 is a brush 178 supported from the hopper 128 by a bracket 180 and the bracket 172, and a brush 179 attached to the front wall 133 of the hopper. At the lower end of the bar 170, respectively at opposite sides thereof, are a pair of laterally spaced guide bars 182 secured to the bar 170 by means of Z-shaped lugs 184. One end of the delivery bar 148 is beveled as at 186 and terminates at the central axis of the stub shafts 136.

Referring particularly to FIGS. 1, 2, 4, 6 to 9 and 24, the passageway for holders 19 which is formed conjointly by the bars 148 and 170 when sector 22 is raised, as in FIG. 7, operatively merges smoothly with the passageway for holders 19 in the magazine 24, which comprises a front guide plate 188 and a pair of laterally spaced guide plates 189 positioned to the rear of plate 188. Preferably, the magazine is made in two sections. The upper section 190 is curved, as shown, and the lower section 191 is straight. The section 190 is provided with ties securing the plates 188 and 189 together and is supported in position by brackets 193 and 194. The section 191 is carried by brackets 195 affixed to the frame 126 and by brackets 196 secured to brackets 195 by means of screws 197 projected through elongated opening 198. The plates 189 are secured to frame 126 by screws 199 projected through elongated openings 201.

Referring particularly to FIGS. 6 and 22 to 26, at the bottom of the magazine 24 is an escapement device, generally designated 200. The device comprises a pair of discs 202 respectively mounted upon a pair of pins 204 extending respectively through the plates 189. The discs are disposed in coplanar relation between the plate 188 and the plates 189 and are provided with notches 206 adapted for conjointly receiving a holder 19. Affixed to one end of each pin 204 is an arm 208, which carries a pin 210 for connection to the upper end of an adjustable link 212. At the lower end of link 212 is a clevis 214 carrying a pin 216 for connection to the upper end of a link 218. The lower ends of the links 218 are connected by pins 220 to a lever 222 pivoted as at 224 to a bracket 225 affixed to the frame of the machine. Affixed to the lever 222 is a rod 226 to which is anchored the upper end of a tension spring 228. The lower end of this spring is anchored to the frame of the machine. The lever 222 carries a roller 230 for a purpose to appear.

Referring particularly to FIGS. 6, 21 and 24 to 26, a horizontally disposed lever 232 is pivoted as at 234 to a bracket 236 affixed to the frame of the machine. Carried by the lever 232 are a pair of laterally spaced nylon feelers 238 adapted for engaging the cigar approaching and next adjacent the tipping station 18. A lateral extension 240 of the lever 232 carries a pin 242 which overlies a weighted member 244 pivoted as at 246 to a bracket 248 affixed to the frame of the machine. A pin 250 keeps the member 244 in an upright position. The lever 232 also mounts a pin 252 adapted for engaging with an underlying plate 253, for a purpose to appear.

Referring particularly to FIGS. 6 and 16 to 20, a bracket 254, secured as by screws 255 to member 52 of the frame 44, has an arm 256 which extends rearwardly and then upwardly to support a glue applicator, generally designated 258. The applicator, made of resilient wire stock, comprises two branches 260 depending from the upper end of the arm 256. The working end of the applicator is turned upwardly as at 262, and each branch terminates in a curved portion 264. A glue pot 266 underlies the glue applicator and is carried by a bracket 268 secured to the frame of the machine, the glue being designated 270.

Referring particularly to FIGS. 3, 4, 6, 22, and 23, at the tipping station 18 is a device for holding down cigars while they are being tipped. The device comprises a member, generally designated 272, having at one end thereof a boss 274 through which extends an upright rod 276. Affixed to the rod 276 are collars 278 and 280 respectively below and above the boss 274. Fitted over the rod 276 is a coil compression spring 282, between the boss 274 and collar 280. The rod 276 extends freely through an opening 284 in the frame of the machine, and the lower terminal portion of the rod is affixed to a bracket 286 secured to one of the members 38. At the opposite end of the member 272 are a pair of laterally spaced bosses 288 through which extend bolts 290 for connection to corresponding ends of a pair of bars 292. Extending freely through the free ends of the bars 292 are a pair of upright rods 294. Affixed to each rod 294 are collars 296 and 298 respectively below and above the bar 292. Fitted over the rod 294 is a coil compression spring 300, between the bar 292 and collar 298. The lower terminal portion of the rod is affixed to the plate 253. The plate 253 is affixed to a bracket 304 secured to the other member 38. The member 272 is provided with depending cigar engaging portions 306 separated, for a purpose to appear, by an opening 308.

Referring particularly to FIGS. 4, 22, and 23, immediately below the escapement 200 is a horizontally extending transfer sleeve, generally designated 26. The leading end of the sleeve, designated 311, is provided with an opening 312 in the top thereof. The trailing end, designated 313, of the sleeve is flanged, slit longitudinal at the top thereof and fitted with a screw 314. Telescoped into the sleeve 26 is a member 316, the terminal portion of which is slit, as at 318, for receiving the mouth end of a holder 19. Intermediate the ends of member 316 is a tapered portion 320. The member 316 is provided with a central bore which receives one end of a spindle 324, which extends through a hollow barrel 326. The sleeve 26 is fitted over one end of the barrel 326 and clamped thereto by means of screw 314. The barrel 326 is slidably fitted in a frame, generally designated 328, and the sleeve 26 and barrel 326 are secured against turning about their central axis by a pin 329 affixed to the transfer sleeve and slidably fitted between a pair of lugs 330 on the frame 328. The barrel 326 is provided with a series of rack teeth 332 on the undersurface thereof, which teeth mesh with a gear 333 affixed to a shaft 334 journaled in frame 328. A gear 335 affixed to the shaft 334 meshes with a segment gear 336 mounted on a shaft 337 journaled in the frame 328. Formed integral with the segment gear 336 is an arm 338, which carries a pin 340 for connection to the upper end of a link 342. The lower end of link 342 carries a pin 344 for connection to one end of a horizontally extending lever 346, which is rockable about the axis of a pin 348 carried by a bracket 350 affixed to the frame of the machine. Carried by lever 346 is a roller 352, which engages an inside cam surface 354 of a cam member 356 affixed to the shaft 112.

Referring particularly to FIGS. 4, 23, and 27, the frame 328 is provided with a recess 358, and mounted upon the spindle 324 is a gear 360, which has a part captured in the recess 358. Meshing with the gear 360 is a gear 364, and meshing with the gear 364 is a gear 366. The gears 364 and 366 are mounted upon a bell lever 368 which is pivotally secured to the shaft 112 by means of a nut 370. The opposite end of the bell lever is fitted with a screw 372 which extends through arcuate opening 374 in the frame of the machine. The gear 366 meshes with a segment gear 376, which carries a pin 378 for connection to the upper end of a link 380. The lower end of the link 380 carries a pin 382 for connection to one end of a lever 384, which is rockable about the axis of a pin 386 supported on a bracket 388 carried by the frame of the machine. The lever 384 carries a roller 390 engaged with an inner cam surface 392 of a cam member 394. Affixed to the shaft 112 is a bevel gear 396 meshing with a companion bevel gear 398. The latter is mounted upon shaft 400 journaled in a bearing 401 carried by the frame 328. Affixed to the shaft 400 is a sprocket 402 about which is trained a chain 404. The chain 404 is also trained about a sprocket 406, which is affixed to a shaft 408 journaled in the frame 328. Affixed to the shaft 408 is a sprocket 410 about which is trained the chain 168.

Referring particularly to FIGS. 1, 3, 4, 13, and 30, affixed to the shaft 112 is a chain sprocket 412 about which is trained a chain 414, which actuates a conveyor, generally designated 16. The conveyor includes a horizontally extending plate member 418, one end of which is notched, as at 419. The notched end of the plate 418 butts against an upright end plate 420, the upper end of which is notched as at 421.

Referring particularly to FIGS. 3, 5, 13, and 30, mounted upon the frame of the machine are a pair of laterally spaced blocks 422 through which slidably project opposite end portions of a pair of bars 424. Affixed to the bars 424 is a block 426, and depending from the block 426 is a member 428 provided with an elongated slot 430 through which freely extends a pin 432 carried by the plates 70. Mounted upon the block 426 is an arm 434 from which depend a pair of laterally spaced pusher fingers 436.

Over the platform 10 is a horizontally extending plate 438 carried by brackets 440 from the frame of the machine. Secured to opposite ends of the plate 438 are the opposite end portions of a chain 442, which underlies the plate 438. The plate 438 is notched as at 444 (FIG. 6) to clear the cigar engaging parts 306 of the hold-down member 272. Extending horizontally along the front of machine is a guide plate 446 affixed to brackets 448 secured to the frame of the machine by bolts 450 extending through elongated openings 452.

Electric power supplied to the machine actuates a suitable motor and speed reducer unit (not shown), which actuates drive chain 108. The chain 108 turns sprocket 110, shaft 112 and cam member 116.

Referring particularly to FIGS. 30 and 31, the low section 120 of cam 116 is engaged with top 48 and side 49 of frame 44 while the high section 118 of cam 116 is engaged with bottom 50 and side 52 of frame 44. Frames 32 and 44 are in their lowermost positions, and frame 44 is in its extreme position to the left. The root surfaces of racks 15 are level with the top of plate 418, and the beveled ends 106 of racks 15 project freely through notch 421 in the end plate 420 and into the notches 419 in plate 418.

Referring particularly to FIGS. 32 and 33, cam 116 has turned clockwise 90° from its initial position shown in FIGS. 30 and 31. Low cam section 120 is engaged with side 49 and bottom 50 of frame 44 while high cam section 118 is engaged with side 52 and top 48 of frame 44. Frame 44 has not moved horizontally, but frames 44 and 32, together with racks 15, have been elevated as a unit from the position of FIG. 30 to that of FIG. 32. The beveled ends 106 of racks 15 are raised above plates 418 and 420 and the root surfaces of racks 15 are level with the upper surface of platform 10. The pusher fingers 436 remain stationary due to lost motion of pin 432 in the elongated opening 430 in member 428.

Referring particularly to FIGS. 34 and 35, cam 116 has turned clockwise an additional 90°, making a total of 180° from its initial position. Low cam section 120 is engaged with bottom 50 and side 52 of frame 44 while high cam section 118 is engaged with top 48 and side 49 of frame 44. Frames 44 and 32 have not been moved vertically, but frame 44, screw 58, block 64, racks 15, block 84 and pusher fingers 436 have been moved to the right as a unit from the position of FIG. 32 to that of FIG. 34, blocks 64 and 84 sliding on members 38.

Referring particularly to FIGS. 36 and 37, cam 116 has turned clockwise still another 90°, making a total of 270° from its initial position. Low cam section 120 is engaged with side 52 and top 48 of frame 44 while high cam section 118 is engaged with side 49 and bottom 50 of frame 44. Frame 44 has not been moved horizontally, but frames 44 and 32, together with racks 15, have been moved downwardly as a unit from the position of FIG. 34 to that of FIG. 36. The pusher fingers 436 have remained stationary due to lost motion of pin 432 in elongated opening 430 in member 428.

When cam 116 is turned clockwise a final 90°, back to its initial position, the frames 44 and 32 do not move vertically, but frame 44 moves to the left with screw 58, blocks 64 and 84, racks 15, and pusher fingers 436 as a unit. The beveled ends 106 of racks 15 re-enter the notches in the plates 418 and 420.

Power for actuation of conveyor 16 is taken from shaft 112 by means of chain drive 414. Cigars are moved over plate 418 in side by side relation toward end plate 420 by a pair of endless conveyor chains, designated 454, the cigars being guided by a pair of guide rails, designated 456.

Referring particularly to FIG. 30, a leading cigar 12a is delivered to end plate 420 and positioned over ends 106 of racks 15. When the racks 15 are raised from the position of FIG. 30 to that of FIG. 32, the leading cigar is separated from the cigars following in side by side relation and is elevated by the ends 106 of the racks 15 to the level of platform 10. When the racks 15 and the pusher fingers 436 move to the right from the position of FIG. 32 to that of FIG. 34, the leading cigar is advanced to a position on the end of platform 10. When the racks 15 move downwardly from the position of FIG. 34 to that of FIG. 36, they leave the leading cigar in its advanced position on the platform 10, and when the racks 15 move to the left from the position of FIG. 36 back to their initial positions, one cycle of movement in a square pattern is completed.

In the next square motion cycle of the machine, when the racks 15 raise the next following cigar, the two endmost fingers of each rack 15 extend upwardly respectively on opposite sides of the leading cigar, and when the racks move to the right the leading cigar is advanced one step, and the next following cigar is placed upon the platform. Thus each cigar is lifted to the elevation of the platform and placed thereon in one cycle, and in each cycle thereafter is advanced one step along the platform from left to right past the tipping station 18 to a wrapping machine at the right hand end of the machine. Chain 442 holds the cigars down on the platform 10 as they move thereover. The pusher fingers 436 assure that a cigar approaching the platform 10 will enter under chain 442. Cigars move over the platform 10 with corresponding ends thereof abutting the guide plate 446. They slide over the platform without rolling.

The motion of frame 44 in a square pattern is imparted through the bracket 254 and arm 256 to the glue applicator 258. FIGS. 16 to 19 show the positions of the applicator 258 corresponding respectively to the conditions shown in FIGS. 30, 32, 34, and 36. In FIG. 16 the applicator is in its lowermost position and in its extreme position to the left, the working ends thereof being submerged in glue 270. In FIG. 17 the applicator is raised and the working ends thereof embrace the cigar tip, thus applying glue thereto, as at 466. In FIG. 18 the cigar and applicator have moved to the right together. FIG. 19 shows the applicator lowered and the working ends thereof disengaged from the cigar. After disengaging from the cigar, the applicator returns to its initial position. The applicator applies glue to the cigar which is fourth from the tipping station 18.

Power taken from shaft 112 by the set of beveled gears 396, 398 turns shaft 400, which, through chain drive 404, actuates shaft 408 and chain drive 168. This results in the actuation of shaft 162 and cam 160. Thus cam roller 158 is raised and lowered, and the levers 154 are rocked. The rocking motion is transmitted through the links 152 to arms 150, which, through stub shafts 136, oscillate the sector 22.

In all positions thereof, the sector 22 extends through and closes an opening in the bottom of the hopper 20. As the sector swings upwardly and forwardly from a position in which the bar 148 is proximate the bottom of the hopper to the position shown in FIG. 7 several holders 19 are picked up by the bar 148 and lifted to the bar 170, whereupon they slide down the bar 148, under the bar 170 and between the bars 181 to the magazine 24, with their mouth ends in the channel 149 and their shoulders resting upon the top of bar 148, on both sides of the channel 149. Brushes 178 keep the sides of the sector free of holders 19. As pointed out heretofore, the passageway formed conjointly by the bars 148 and 170 merges smoothly with the passageway through magazine 24. Thus, when the holders 19 leave the bar 148, they enter the magazine 24 with mouth ends between the plates 189, shoulders resting on plates 189 and cigar receiving ends between plates 189 and 188. Holders 19 are gravity fed through the magazine to the escapement 200.

Referring particularly to FIG. 24, lever 222 is biased by spring 228 clockwise about pin 224, in consequence of which the roller 230 engages the undersurface of plate 253. The links 218 and 212 are in their lowermost positions. Arms 208 are turned downwardly, and notches 206 in discs 202 face upwardly and toward each other for conjointly receiving the lowermost holder 19 in the machine.

When plate 253 is raised, as in FIG. 25, roller 230 and lever 222 follow, and through links 218 and 212 and arms 208 discs 202 are turned about the axes of pins 204, in consequence of which the notches 206 in the discs 202 face downwardly and toward each other, releasing a holder 19 from the magazine.

Referring particularly to FIG. 21, normally a feeler 238 rests upon the cigar next to the tipping station 18, thus holding up the pins 242 and 252. When there is no cigar under the feelers 238, the feelers engage the platform 10, pin 242 engages weighted member 244 and pin 252 engages plate 253, as shown in FIG. 26. When the pin 242 is lowered, it engages the weighted member 244 and swings it about pin 246 to the position shown in FIG. 26, wherein the lower end of the weighted member is detachably engaged with the lever 222. When plate 253 is elevated, pin 252 moves upwardly, causing lever 232 to raise feelers 238 and pin 242, but the weighted member 244 secures the lever 222 against following, in consequence of which the escapement remains closed.

A holder 19 passed by the escapement 200 drops into the transfer sleeve 26 through the opening 312. The mouth end of the holder is received by the slit 318 formed in the end of the member 316.

Roller 352 is raised and lowered by cam surface 354 as the cam member 356 rotates with the shaft 112. As the roller 352 is raised and lowered, the lever 346 is rocked about pin 348, in consequence of which the link 342 rocks the arm 338 and the segment gear 336 about the axis of shaft 337. The segment gear 336 rocks gear 335, shaft 334, and gear 333, and gear 333 shifts the barrel 326 axially back and forth. When the barrel 326 moves forwardly from the position shown in FIG. 23 to that of FIG. 22, the spindle 324, member 316, sleeve 310 and holder 19 are advanced toward the cigar at the tipping station 18.

Simultaneously with the movement of the barrel 326 forwardly, the cam surface 392 of cam member 394, which turns with shaft 112, raises and lowers the roller 390, thereby rocking lever 384 about the axis of pin 386. Link 380 rocks segment gear 376 about the axis of shaft 112, in consequence of which the meshing gears 366, 364 and 360 are actuated. The gear 360 turns the spindle 324, member 316 and the holder as a unit. The barrel 326 and sleeve 310 do not turn; they are secured against turning by pin 329 sliding between lugs 330. Gear 360 is mounted on spindle 324 for axial shifting movement of the spindle relative thereto.

Each time the racks 15 move from the position of FIG. 32 to that of FIG. 34, a cigar is moved to the tipping station 18 and placed in registry with the axis of the sleeve member 26 and member 316. As frames 32 and 44 are lowered from the position of FIG. 34 to that of FIG. 36, member 272 is lowered and the cigar engaging parts 306 thereof, straddling the plate 438 and chain 442 yieldably engage the cigar and hold it down. One end of the cigar abutts the guide plate 446.

As the holder 19 is advanced and turned about its axis, it is placed over the adhesive covered end of the cigar.

When the sleeve 310, member 316 and spindle 324 are retracted, initial movement is effected without turning the members about their axis. After the member 316 is disengaged from the mouth end of the holder 19, the sleeve 26, member 316 and spindle 324 are turned back to their initial positions.

The central axis of the sleeve 26, member 316 and spindle 324 is fixed in position, in consequence of which when changing over from the tipping of cigars of a certain diameter and length to the tipping of, for example, cigars of a larger diameter and length, certain adjustments are necessary. The platform 10 is supported at each end by a bracket 460 affixed to the frame of the machine by bolts 462 projected through elongated openings 464. The bolts are loosened, the platform 10 suitably lowered and then the bolts are retightened.

In addition to lowering the platform 10, the racks 15 must be lowered a corresponding distance and moved to the left. To effect lowering of the racks, the screws 76 and 90 are loosened, whereupon the racks may be suitably lowered and then the screws retightened. Movement of the racks to the left is effected by manipulating the screw 58.

Furthermore, the delivery bar 148 and section 190 of the magazine 24 are removed, and a delivery bar and magazine section suitable in size are substituted therefor. The section 191 of the magazine 24 must be adjusted to correspond with the size of the section 190. This is effected by loosening the screws 197 and 199, adjusting the brackets 196 and plates 189 and then retightening the screws.

The sleeve 310 and member 316 are removed by loosening the screw 314 and are replaced by a sleeve 310 and member 316 suitable in size.

The guard member 446 is moved to suit the length of the cigar.

It will be noted that cigars are not rolled over platform 10; they slide over the platform without rolling. This is a distinct advantage in that the holders 19 are delivered to the wrapping machine all oriented in the same manner, which simplifies the wrapping operation.

In twisting the holders 19 onto the cigars, it is desired to tighten the roll of the cigar, not to loosen it. If the machine is set up to turn holders 19 in one direction and the cigars are wrapped in the opposite direction, it is merely necessary to loosen screw 372, move bell lever 368 so that gear 366 meshes directly with gear 360 (FIG. 29) and retighten screw 372.

It should be noted that movement of the racks 15 in a square pattern lends itself to smooth running of the machine at very high speed, in the order of twice the speed of known machines.

It will be understood, of course, that the present invention, as shown and described, is susceptible to various modifications which may be made without any departure from the general principles or real spirit of the invention. Accordingly, it is intended to claim the invention broadly, as well as specifically, as indicated in the appended claims.

Having thus described my invention, I claim as follows:

1. A machine for applying tips or the like to cigars comprising a stationary platform, cigar advancing means including a rack having a horizontally disposed main body and a plurality of fingers extending upwardly therefrom, each between an adjacent pair of cigars on said platform, means mounting said rack for being extended horizontally in cigar advancing direction, lowered from its extended position for disengagement of said fingers from said cigars, retracted horizontally from its extended and lowered position, and raised from its retracted and lowered position to its initial position for re-engagement of said fingers with said cigars advanced as aforesaid, said rack having a fingerless terminal portion which is positioned, when said rack is in its retracted and lowered position, for receiving cigars successively fed thereto, means for actuating said rack in repeating cycles to advance each cigar successively from finger to finger to a cigar tipping station, while lifting cigars as they are successively fed to said rack to the elevation of said platform, means for successively sliding each cigar lifted in the manner aforesaid onto said platform when said rack is extended to advance said cigars, means for delivering a tip to a point aligned with a cigar on said platform at the tipping station, and means for axially shifting a cigar tip delivered to said point to effect its application to the opposed end of a cigar on said platform at the tipping station.

2. A machine for applying tips or the like to cigars comprising a stationary platform, means for moving a series of cigars over said platform past a tipping station, said cigars being supported by said platform throughout movement thereover, tip delivering means operable for positioning a tip in axially aligned relation to a cigar on said platform at said tipping station and for positioning said tip opposite one end of said cigar, and means for axially shifting said tip to effect its application to the opposed end of said cigar, said tip shifting means being operable for imparting rotational movement to the tip selectively in either direction to tighten the roll of a cigar.

3. A machine for applying tips or the like to cigars comprising a stationary platform, means for moving a series of cigars over said platform past a tipping station, said cigars being supported by said platform throughout movement thereover, tip delivering means operable for positioning a tip in axially aligned relation to a cigar on said platform at said tipping station and for positioning said tip opposite one end of said cigar, and means for rotating and axially shifting said tip to effect its application to the opposed end of said cigar and then withdrawing to its initial position, the withdrawing movement being non-rotational until said tip applying means is fully disengaged from said tip.

4. A machine for applying tips or the like to cigars comprising a stationary platform, cigar advancing means including a plurality of fingers each adapted for extending upright between an adjacent pair of cigars of a series thereof on said platform, said cigar advancing means being operable for sliding said series of cigars along said platform, withdrawing said fingers from between said cigars and returning said fingers to their initial positions for re-engagement with the cigars on said platform advanced as aforesaid, cam follower means operatively connected to said cigar advancing means, single cam means independently operable for actuating said cam follower means and thereby said cigar advancing means in a rectangular pattern in repeating cycles to advance each cigar on said platform successively from finger to finger progressively to a cigar tipping station without lifting said cigars from said platform, means for delivering a tip to a point aligned with a cigar on said platform at said tipping station, and means for axially shifting said cigar tip to effect its application to the opposed end of said cigar, said cigar advancing means being operable also for moving the tipped cigars from said tipping station.

5. A machine for applying tips or the like to cigars comprising a stationary platform, cigar advancing means including a rack having a horizontally disposed main body and a plurality of fingers each adapted for extending upwardly between an adjacent pair of cigars of a series thereof on said platform respectively from main body portions longitudinally spaced uniformly along the length of said main body, the upwardly facing root surface areas of said main body, between said fingers, being disposed at an elevation at least as low as the surface of said platform, said cigar advancing means being operable for sliding said series of cigars along said platform, withdrawing said fingers downwardly from between said cigars and returning said fingers to their initial positions for re-engagement with the cigars on said platform advanced as aforesaid, cam follower means operatively connected to said cigar advancing means, a single edge cam independently operable for actuating said cam follower means and thereby said cigar advancing means in a square pattern in repeating cycles to advance each cigar on said platform successively from finger to finger progressively to a cigar tipping station without lifting said cigars from said platform, means for delivering a tip to a point aligned with a cigar on said platform at said tipping station, and means for axially shifting said cigar tip to effect its application to the opposed end of said cigar, said cigar advancing means being operable also for moving the tipped cigars from said tipping station.

References Cited in the file of this patent

UNITED STATES PATENTS

| | | |
|---|---|---|
| 1,145,774 | Kotsovsky | July 6, 1915 |
| 1,493,661 | Wilcox | May 13, 1924 |
| 1,775,121 | Einfeldt | Sept. 9, 1930 |
| 1,830,446 | Schunemann | Nov. 3, 1931 |
| 2,005,522 | Holm | June 18, 1935 |
| 2,539,070 | Gebo | Jan. 23, 1951 |
| 2,695,650 | Weisenburg | Nov. 30, 1954 |
| 2,827,904 | Halstead | Mar. 25, 1958 |
| 2,981,262 | Farkas | Apr. 25, 1961 |
| 2,985,900 | Nouvelet | May 30, 1961 |
| 3,007,476 | Baugher et al. | Nov. 7, 1961 |
| 3,012,344 | Schott | Dec. 12, 1961 |